(12) United States Patent
Mack

(10) Patent No.: US 9,864,090 B2
(45) Date of Patent: Jan. 9, 2018

(54) OBJECT DETECTION FOR A POWER TRANSFER SYSTEM

(71) Applicant: Robert Bosch GmbH, Stuttgart (DE)

(72) Inventor: Juergen Mack, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 356 days.

(21) Appl. No.: 14/410,490

(22) PCT Filed: Apr. 29, 2013

(86) PCT No.: PCT/EP2013/058834
§ 371 (c)(1),
(2) Date: Dec. 22, 2014

(87) PCT Pub. No.: WO2014/000912
PCT Pub. Date: Jan. 3, 2014

(65) Prior Publication Data
US 2015/0346380 A1 Dec. 3, 2015

(30) Foreign Application Priority Data

Jun. 26, 2012 (DE) .................. 10 2012 210 897

(51) Int. Cl.
*H02J 5/00* (2016.01)
*G01V 3/10* (2006.01)
(Continued)

(52) U.S. Cl.
CPC .............. *G01V 3/38* (2013.01); *G01V 3/101* (2013.01); *H02J 5/005* (2013.01); *H02J 7/025* (2013.01); *H02J 17/00* (2013.01)

(58) Field of Classification Search
None
See application file for complete search history.

(56) References Cited

U.S. PATENT DOCUMENTS

2009/0001932 A1   1/2009  Kamijo et al.
2009/0322158 A1*  12/2009  Stevens ............... H02J 5/005
                                                    307/104

(Continued)

FOREIGN PATENT DOCUMENTS

CN   101414765 A   4/2009
CN   102239619 A   11/2011
(Continued)

OTHER PUBLICATIONS

International Search Report for PCT/EP2013/058834, dated Sep. 17, 2013.

*Primary Examiner* — Jared Fureman
*Assistant Examiner* — Aqeel Bukhari
(74) *Attorney, Agent, or Firm* — Norton Rose Fulbright US LLP; Gerard Messina

(57) ABSTRACT

A power transfer system includes: a transmitting device having a transmitting coil and a receiving device having a receiving coil, the two coils being inductively coupleable to one another for the purpose of transferring power, so that a power transfer path exists between them; an electrical load for connecting with terminals of the receiving coil; a detection device for detecting an electrical parameter which indicates the inductance of the transmitting coil while the electrical load is connected to the receiving coil; and a determination device for determining an object in the area of the power transfer path on the basis of the detected parameter.

11 Claims, 3 Drawing Sheets

(51) Int. Cl.
    *G01V 3/38*     (2006.01)
    *H02J 7/02*     (2016.01)
    *H02J 17/00*     (2006.01)

(56) References Cited

U.S. PATENT DOCUMENTS

| | | | | |
|---|---|---|---|---|
| 2011/0128015 A1* | 6/2011 | Dorairaj | ............... | H02J 5/005 |
| | | | | 324/629 |
| 2012/0091993 A1* | 4/2012 | Uramoto | ............... | H02J 7/025 |
| | | | | 324/105 |
| 2012/0175967 A1* | 7/2012 | Dibben | ............... | H02J 5/005 |
| | | | | 307/104 |

FOREIGN PATENT DOCUMENTS

| | | |
|---|---|---|
| JP | 2006060909 A | 3/2006 |
| KR | 100992480 B1 | 11/2010 |
| WO | 2009081115 A1 | 7/2009 |
| WO | WO 2009/181115 | 7/2009 |
| WO | 2011132507 A1 | 10/2011 |

\* cited by examiner

OBJECT DETECTION FOR A POWER TRANSFER SYSTEM

BACKGROUND OF THE INVENTION

1. Field of the Invention

The present invention generally relates to a wireless power transfer, and the present invention particularly relates to a system and a method for detecting an object on a power transfer path of a wireless power transfer.

2. Background of the Invention

A small power device includes a consumer and an accumulator in order to allow for wireless utilization. To charge the accumulator, power may be transferred wirelessly from a power supply to the small device by using an electromagnetic field to transfer power. For this purpose, the power supply and the small device each include a coil, the coils being positioned at a small distance from one another and thus essentially together forming a transformer.

If an electrically conductive object gets into the area of the electromagnetic field, eddy currents may form which heat the object. If the object is magnetizable, the object may also be heated through core or hysteresis losses. The heating may be considerable, so that an operational reliability of the transmitter or of the receiver cannot be ensured. Moreover, the object may withdraw power from the electromagnetic field, so that the power transfer to the receiver is interfered with.

It is possible to detect the presence of the object by determining the influence of the object on the inductance of the transmitter coil. If, however, the object is relatively small or relatively far away from the transmitting coil, it may be difficult to reliably detect the object.

The object underlying the present invention is therefore to provide a system, a method, and a computer program product, with the aid of which a preferably precise, reliable, and highly sensitive determination of the object may be carried out, in order to enable a response to the presence of the object. The present invention achieves the objects indicated above with the aid of a power transfer system, a method, and a computer program product.

BRIEF SUMMARY OF THE INVENTION

A power transfer system according to the present invention includes a transmitting device having a transmitting coil and a receiving device having a receiving coil, the coils being inductively coupleable to one another for the purpose of transferring power, so that a power transfer path exists between them. The power transfer system furthermore includes an electrical load for connecting with terminals of the receiving coil, a detection device for detecting an electrical parameter which indicates the inductance of the transmitting coil while the electrical load is connected to the receiving coil, and a determination device for determining an object in the area of the power transfer path on the basis of the detected parameter.

By providing an electrical load at the terminals of the receiving coil, a voltage which is induced in the receiving coil acts similarly to a current source, so that the receiving coil generates or intensifies its own magnetic field. If a magnetizable object is present in the area of the power transfer path, in particular close to the receiving coil, it may thus be exposed to an intensified magnetic field. The power which the object withdraws from the magnetic field due to the eddy currents, hysteresis losses or core losses, may be increased as a result. Accordingly, an effect of the object on the inductance of the transmitting coil may also be increased. This change may be detectable in an improved manner, so that the object may be detected with improved accuracy. Moreover, a smaller object or an object which is less susceptible to the magnetic field may also be detectable with the aid of the system described above.

In one preferred specific embodiment, the electrical load includes a short circuit. It is preferred in any case to increase the electrical load of the receiving coil in relation to a usual charging operation, so that an increased current flows through the receiving coil, while the electrical load is connected to the receiving coil. A short circuit may contribute to maximizing this current without providing an additional load.

In one specific embodiment, the receiving coil includes multiple windings and the electrical load is configured to be connected to the terminals of only one winding of the receiving coil. In this way, the magnetic field generated by the receiving coil may be controllable in an improved manner. In particular, the winding which is connectable with the electrical load may be configured to allow for an increased current flow rate without damage, e.g., by using a correspondingly thicker wire for this winding.

In one refinement, a separating device may be provided for separating the terminals of at least one of the other windings from electrical loads. In this way, the determination may take place under conditions which are better controllable and better reproducible. With the aid of the separating device, a useful load may, in particular, be separated from the receiving coil, the power supply of which is the purpose of the power transfer.

In one specific embodiment, the power transfer system includes a resonance transformer which includes a resonance capacitor and the transmitting coil, the detecting device being configured to detect the electrical parameters at the resonance transformer.

A change in the inductance of the transmitting coil may result in a changed vibration behavior of the resonance transformer, the resonance behavior being easily determinable by measurement.

The electrical parameter may include one of a current, a frequency, a phase or an attenuation. Some of these parameters may be advantageously determinable at the above-described resonance transformer. Instead of the attenuation, a quality factor of the resonance transformer may also be determined.

Here it holds:

$$D = \frac{1}{Q},$$

where D is the attenuation and Q is the quality factor (the quality).

A method according to the present invention for detecting an object in the area of an inductive power transfer path, which exists between a transmitting coil and a receiving coil which is inductively coupleable with the transmitting coil, includes the steps of connecting an electrical load with the terminals of the receiving coil, detecting an electrical parameter which indicates the inductance of the transmitting coil, and determining the object on the basis of the detected parameter.

The method may be implementable in a conventional inductive power transfer system. If an object was determined, the power transfer may be throttled or stopped in order to prevent overheating of the object and to reduce an accident risk associated with that.

The magnetic field, to which the object is exposed, may be advantageously controlled by the transmitting device, and the effect of a potentially present object in the area of the power transfer path may be detected at the same time, also by the transmitting device.

In one preferred specific embodiment, the object is determined on the basis of a change of the electrical parameter during a change of voltage at the terminals of the transmitting coil. The voltage at the transmitting coil may be changed continuously or abruptly, a periodic change also being possible. For example, objects of different sizes or susceptibilities may be detectable. In particular, it may be avoided that for the purpose of determining its effect, the object is exposed to a strong enough magnetic field for dangerous overheating to occur already during the determination.

In another specific embodiment, which may be combined with the latter specific embodiment, the object is determined on the basis of a change of the electrical parameter during a change of the electrical load of the receiving coil. The advantages mentioned above may also be achieved with this specific embodiment.

A computer program product according to the present invention includes program code means for carrying out the described method when the computer program product runs on a processing device or is stored on a computer-readable data carrier.

DETAILED DESCRIPTION OF THE INVENTION

Figure 1:
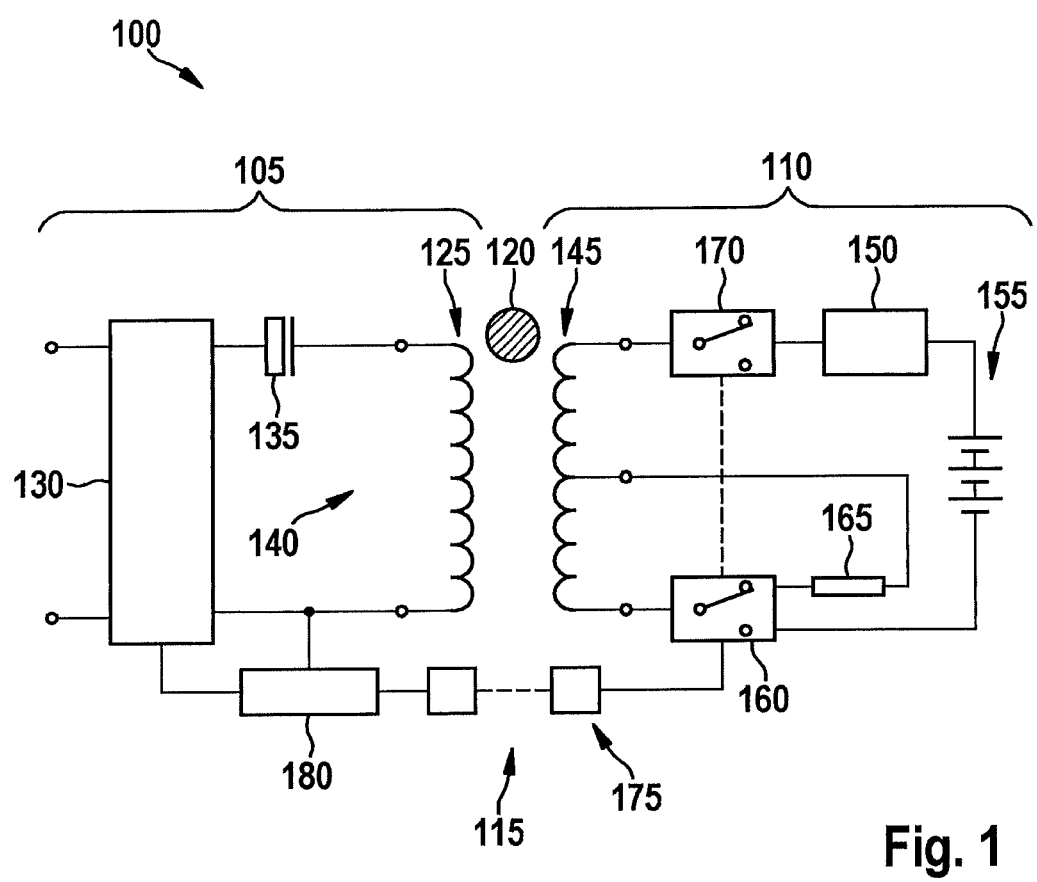
FIG. 1 shows a system for wireless power transfer.

FIG. 1 shows a system 100 for wireless power transfer. System 100 includes a transmitting device 105 and a receiving device 110 between which a power transfer path 115 is defined. In the area of power transfer path 115, an object 120 may be present. Object 120 is conductive or magnetizable, so that a changing magnetic field could cause eddy currents, hysteresis losses, or core losses in object 120 which heat object 120. It is the object of illustrated system 100 to determine the existence of object 120.

Transmitting device 105, which may be included in a power supply, for example, includes a transmitting coil 125 for converting an electric current in a magnetic field in the area of power transfer path 115. Transmitting coil 125 is connected to a voltage source 130 which makes available an alternating current. Voltage source 130 may be connected to a conventional power supply system. A resonance capacitor 135 is preferably connected to transmitting coil 125 in series with voltage source 130, so that resonance capacitor 135 forms a resonance transformer 140 together with transmitting coil 125. Resonance capacitor 135 may, however, also be connected in parallel to transmitting coil 125. A resonance frequency of resonance transformer 140 is a function of the inductance of transmitting coil 125 as well as the capacitance of resonance capacitor 135.

A receiving coil 145 of receiving device 110 is situated at the other end of power transfer path 115. In known receiving devices, receiving coil 145 is directly connected to a useful load which includes a charge controller 150 for an accumulator 155, as an example, in the illustration of FIG. 1. In contrast, a switching device 160 is also provided in the present case in order to connect an electrical load 165 to terminals of receiving coil 145. Electrical load 165 may, in particular, include a low-resistance load or a short circuit. In one specific embodiment, the useful load, i.e., charge controller 150 and/or accumulator 155 in this case, may remain connected to the terminals of receiving coil 145. In another specific embodiment, the useful load is separated from receiving coil 145 at least on one side, while electrical load 165 is applied to receiving coil 145.

In the illustrated specific embodiment, receiving coil 145 includes multiple windings, the ends of which are separated as terminals at receiving coil 145. Switching device 160 is configured to connect electrical load 165 to only one of the windings of receiving coil 145. A separating device 170 is preferably provided for the purpose of separating one or more of the remaining windings from electrical loads, in particular the useful load, while another winding of receiving coil 145 is connected to electrical load 165.

A transfer device 175 is preferably provided for the purpose of being able to control switching device 160 and, if necessary, also separating device 170 with the aid of transmitting device 105. Transfer device 175 may be implemented to be wired or wireless, an information transfer with the aid of a variation of the magnetic field in the area of power transfer path 115 being provided in one specific embodiment.

On the side of transmitting device 105, transfer device 175 is connected to a control unit 180 which controls system 100 for the purpose of determining object 120. Control unit 180 is preferably also configured to control a conventional power transfer process from transmitting device 105 to receiving device 110. For this purpose, control device 180 may be connected to voltage source 130. Furthermore, control device 180 may be linked to transmitting coil 125 or resonance transformer 140 in such a way that control device 180 may scan an electrical parameter which indicates the inductance of resonance transformer 140. This parameter may include an electric current, an electrical voltage, a frequency, attenuation, or a quality factor at transmitting coil 125 or resonance transformer 140.

Control unit 180 is configured to activate receiving device 110 in such a way that electrical load 165 is connected to receiving coil 145. In one preferred specific embodiment, voltage source 130 may be activated simultaneously or subsequently to change the voltage at transmitting coil 125. Object 120 may be determined on the basis of a change of the electrical parameter or on the basis of an absolute value of the electrical parameter which indicates the inductance of transmitting coil 125.

Figure 2:
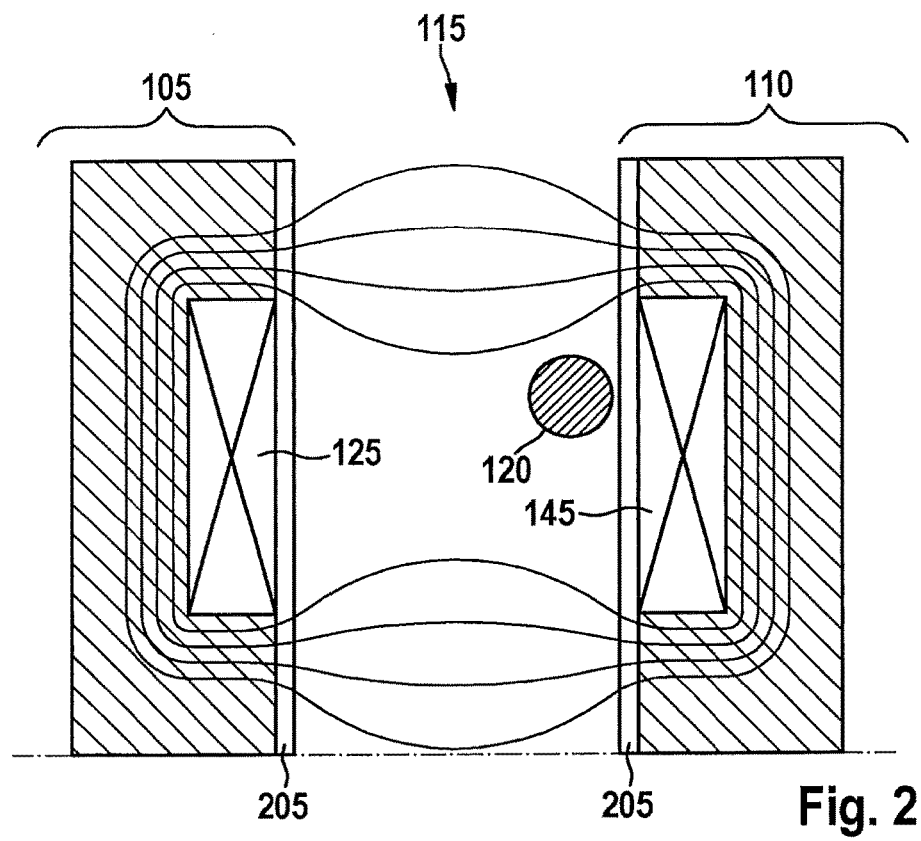
FIG. 2 shows a detail of the system from FIG. 1.

FIG. 2 shows a section from power transfer path 115 from FIG. 1. The illustration corresponds to a part of an exemplary physical configuration of transmitting coil 125 and receiving coil 145 as the parts of transmitting device 105 and receiving device 110, respectively. Power transfer path 115 is indicated between coils 125 and 145. Moreover, magnetic field lines are indicated between coils 125 and 145. Object 120 is situated between delimitations 205 which represent sections of the housings of transmitting device 105 or receiving device 110, as an example.

Figure 3:
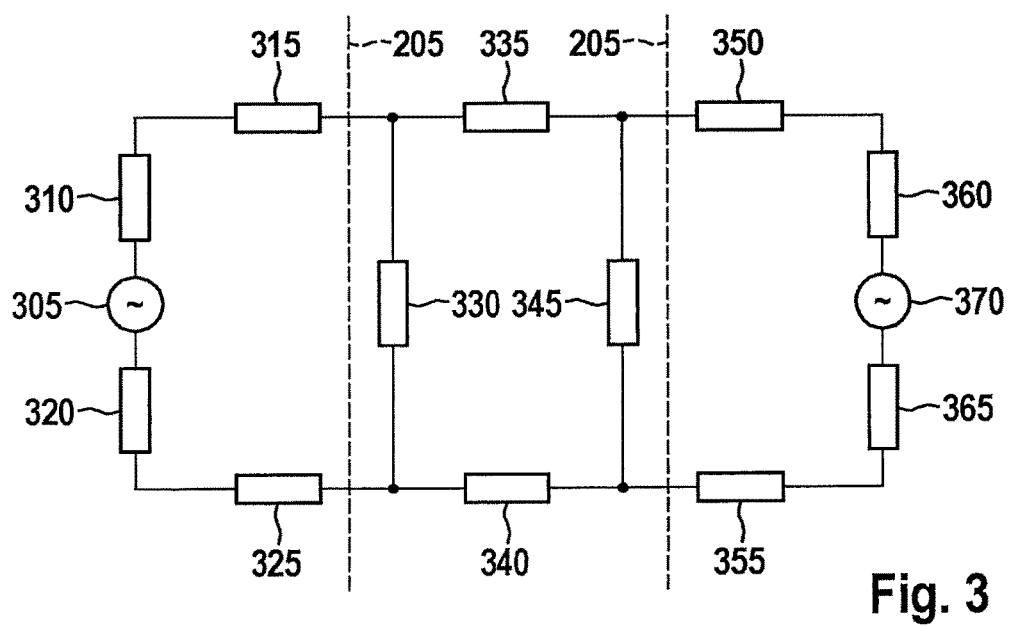
FIG. 3 shows an equivalent circuit diagram for a magnetic flux in the area illustrated in FIG. 2.

FIG. 3 shows a magnetic equivalent circuit diagram for the area illustrated in FIG. 2. In this case, resistance symbols represent magnetic resistances and voltage source symbols represent magnetic through flows. The illustration is true to position with regard to the illustration of FIG. 2.

A first magnetic through flow 305 represents the magnetic inductance (B field) which is formed by actively energized transmitting coil 125. Magnetic resistances 310, 315, 320 and 325 represent the resistances in the horizontal and the vertical areas around transmitting coil 125. Beyond housing 205 of transmitting device 105, a vertically running magnetic resistance 330 represents magnetic dispersion losses. Magnetic resistances 335 and 340 represent resistances in the horizontal direction between housings 205. A magnetic resistance 345 represents the magnetic flux through object 120. Beyond second housing 205, on the right in FIG. 3, other magnetic resistances 350 through 365, as well as a second magnetic through flow 370, are denoted which correspond to elements 305 through 325.

The illustrated equivalent circuit diagram applies only if receiving coil 110 is in idle state, i.e., when no electrical consumer is connected to receiving coil 110. Due to the electrical load, the voltage induced in receiving coil 145 is immediately converted back into a magnetic field, so that second magnetic through flow 370 may be understood to mean a controllable source, the magnetic flux of which is proportional to the magnetic flux of first magnetic through flow 305.

If electrical load 165 is low, as is the case during a normal charging operation of system 100, second magnetic through flow 370 is also low. The greater electrical load 165, the greater is magnetic through flow 370. The inductance of transmitting coil 125 decreases with increasing through flow 370, which may be determined based on an increasing resonance frequency of resonance transformer 140, for example.

In order to increase the inductance of transmitting coil 125, the magnetic flux of first magnetic through flow 305 may be increased on the one hand, and, on the other hand, the magnetic resistance of second through flow 370 may be reduced. In order to increase the magnetic flux, the winding number of transmitting coil 125 or the current flowing through transmitting coil 125 may be increased. In order to increase the magnetic flux, receiving coil 145 may also be electrically loaded or short-circuited, whereby the magnetic flux through object 120 or through magnetic resistance 345 of object 120 increases as a whole.

Figure 4:
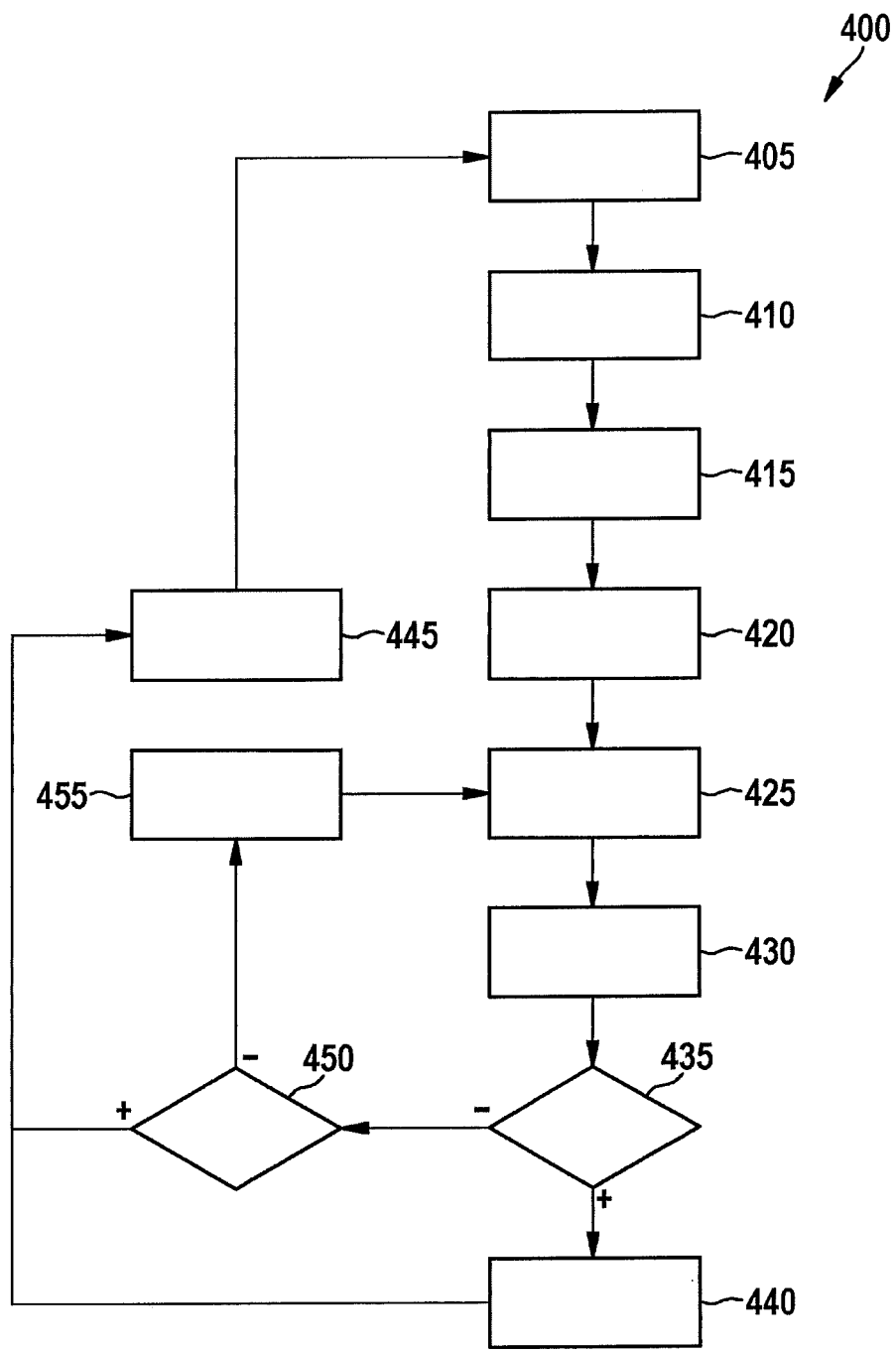
FIG. 4 shows a flow chart of a method for determining an object in the system of FIG. 1.

FIG. 4 shows a flow chart of a method 400 for determining an object 120 in the system of FIG. 1. Method 400 is in particular configured to control system 100 through control unit 180. In one specific embodiment, a computer program product for controlling a programmable microcomputer is involved which is included in control unit 180.

The method starts in a step 405 in which a usual charging operation takes place, during which electrical energy is transported from transmitting coil 125 to receiving coil 145 on power transfer path 115 with the aid of a magnetic alternating field.

In order to determine object 120, receiving coil 145 is separated from useful load 150, 155 in a step 410. This step may also be skipped.

Subsequently, receiving coil 145 is connected to an electrical load 165, so that the current flowing through receiving coil 145 is increased.

Furthermore, an excitation for transmitting coil 125 is determined in a step 420 by activating voltage source 130 to make available a predetermined voltage. Subsequently, transmitting coil 125 is excited in a step 425, preferably using an alternating voltage. The alternating voltage may be predetermined by a resonance frequency of resonance transformer 140.

Subsequently, an electrical parameter is detected at transmitting coil 125 or resonance transformer 140 in a step 430. On the basis of the detected parameter, it is determined in a step 435 whether object 120 is present in the area of transfer path 115. If this is the case, a corresponding measure, such as a reduction of the transferred power or a discontinuation of the power transfer, may be taken in a step 440. Subsequently, receiving coil 145 is again separated from electrical load 165 in a step 445 and connected to the original load, e.g., useful load 150, 155, if necessary. Subsequently, the method may return to step 405 and be repeated.

If it was determined in step 435 that an object 120 is not present, it is checked in a subsequent step 450 whether all intended excitations of transmitting coil 125 have already been applied. If this is the case, object 120 cannot be determined and method 400 returns to step 405 via step 445.

Otherwise, the excitation is changed in a step 455 before method 400 proceeds with step 425. If only one excitation is used, steps 450 and 455 may be dispensed with.

What is claimed is:

1. A power transfer system comprising:
   a transmitting device having a transmitting coil;
   a receiving device having a receiving coil inductively coupleable to the transmitting coil for the purpose of transferring power, so that a power transfer path exists between the transmitting coil and the receiving coil;
   an electrical load for connecting with terminals of the receiving coil, the electrical load including a low-resistance load or a short circuit;
   a useful load for connecting with terminals of the receiving coil, the useful load including at least an accumulator;
   a detection device for detecting an electrical parameter indicating an inductance of the transmitting coil, while the electrical load is connected to the receiving coil; and
   a determination device for determining an object in the area of the power transfer path on the basis of the detected electrical parameter.

2. The power transfer system as recited in claim 1, wherein the electrical load includes a short circuit.

3. The power transfer system as recited in claim 2, wherein the receiving coil includes multiple windings and the electrical load is configured for connecting with terminals of only one winding.

4. The power transfer system as recited in claim 3, further comprising:
   a separating device for separating the terminals of the remaining windings of the receiving coil from electrical loads.

5. The power transfer system as recited in claim 3, further comprising:
   a resonance transformer which includes a resonance capacitor and the transmitting coil, the detecting device being configured to detect the electrical parameter at the resonance transformer.

6. The power transfer system as recited in claim 3, wherein the electrical parameter includes one of a current, a frequency, a phase or an attenuation.

7. A method for detecting an object in the area of an inductive power transfer path existing between a transmitting coil and a receiving coil which is inductively coupleable with the transmitting coil, the receiving coil being connected to a useful load which at least includes an accumulator, the method comprising:

connecting an electrical load with terminals of the receiving coil, the electrical load including a low-resistance load or a short circuit;

detecting an electrical parameter which indicates an inductance of the transmitting coil;

determining the object on the basis of the detected electrical parameter; and separating the electrical load from the receiving coil again, when the electrical parameter has been detected.

8. The method as recited in claim 7, wherein the object is determined on the basis of a change of the electrical parameter during a change of the voltage at terminals of the transmitting coil.

9. The method as recited in claim 7, wherein the object is determined on the basis of a change of the electrical parameter during a change of the electrical load of the receiving coil.

10. A non-transitory, computer-readable data storage medium storing a computer program having program codes which, when executed on a computer, performs a method for detecting an object in the area of an inductive power transfer path existing between a transmitting coil and a receiving coil which is inductively coupleable with the transmitting coil, the receiving coil being connected to a useful load which at least includes an accumulator, the method comprising:

connecting an electrical load with terminals of the receiving coil, the electrical load including a low-resistance load or a short circuit;

detecting an electrical parameter which indicates an inductance of the transmitting coil;

determining the object on the basis of the detected electrical parameter; and separating the electrical load from the receiving coil again, when the electrical parameter has been detected.

11. The power transfer system as recited in claim 3 wherein the only one winding is thicker than a remainder of the multiple windings of the receiving coil.

\* \* \* \* \*